Figure 1:
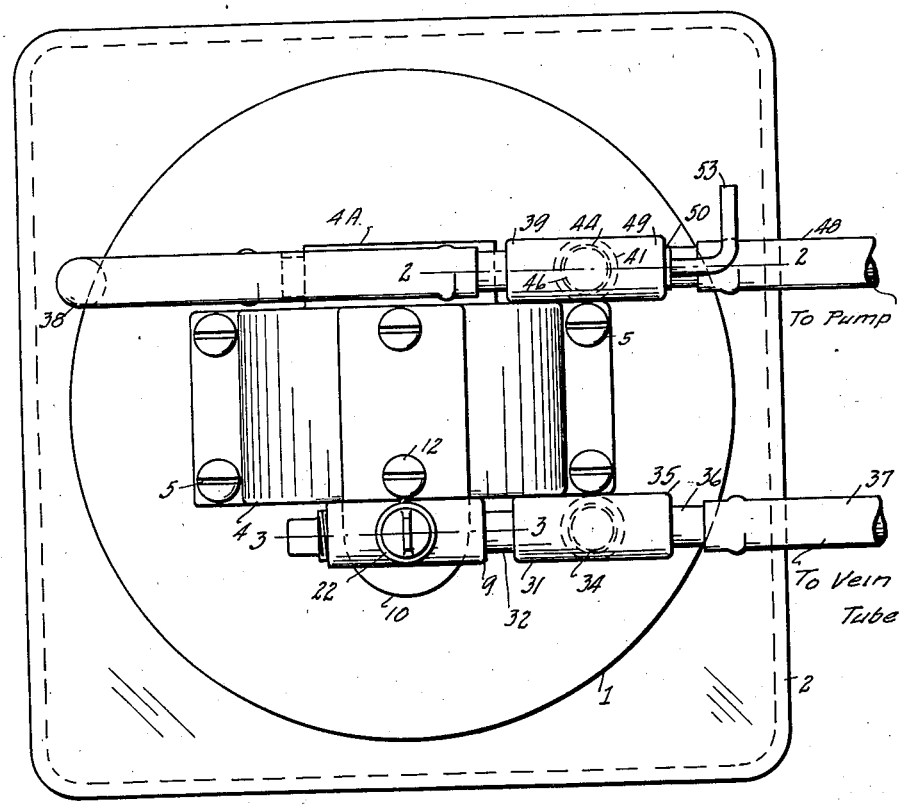

Feb. 25, 1941. C. P. MOODY 2,232,863
PREPARATION OF CADAVERS FOR BURIAL
Original Filed May 15, 1940 2 Sheets-Sheet 1

Feb. 25, 1941.  C. P. MOODY  2,232,863
PREPARATION OF CADAVERS FOR BURIAL
Original Filed May 15, 1940  2 Sheets-Sheet 2

Patented Feb. 25, 1941

2,232,863

UNITED STATES PATENT OFFICE 2,232,863

PREPARATION OF CADAVERS FOR BURIAL

Clay P. Moody, North Bend, Oreg.

Original application May 15, 1940, Serial No. 335,357. Divided and this application November 23, 1940, Serial No. 366,826

9 Claims. (Cl. 27—24)

My invention relates to an apparatus for aspirating fluid-holding portions of the cadaver, such as the cavities and the venous system, wherein the vacuum or suction on the blood jar and vein tube or trocar is automatically periodically interrupted or weakened by the admission of small quantities of air at atmospheric pressure thereto, whereby a regurgitation takes place which causes matter tending to clog the trocar or vein tube to be cleared therefrom or broken up so that it will be carried thru to the blood jar or some other means of disposition, and whereby the suction is divided into pronounced surges of suction separated by periods of non-suction or weaker suction, which periods allow for the recovery of the veins so that they may be continually aspirated without collapsing them.

This application is a division of my application for a Method of preparing a cadaver for burial, filed May 15, 1940, Ser. No. 335,357.

The principal objective of my invention is to do a better job of embalming.

Another objective is to be able to accomplish this with the equipment at hand in every establishment for the preparation of cadavers for burial, that is, by being able to use ordinary trocars and vein tubes.

Another objective is the aspiration of the venous system of the cadaver.

Another objective is the aspiration of the venous system without collapsing the veins thereof in the majority of cases.

Another objective is to be able to aspirate said venous system without having to remove the vein tube, after it is once inserted in the vein and tied in, because of clogging, excepting possibly clogging because of non-yieldable matter in the blood stream such as is due to thrombosis in which the thrombus is usually too hard and too tough to be broken up, or too large to pass thru the vein tube.

Another objective is to be able to aspirate the cavities of the cadaver without having to remove the trocar therefrom because of clogging which occurs in a majority of cases.

Another objective is to be able to clear either the vein tube or trocar automatically of yieldable obstruction—that is, without the attention of the operator or the manipulation of devices by him.

A further objective is to provide a continuous aspiration apparatus which may be used in conjunction with the so-called "constant-pressure" equipment now in general use which provides a blood jar upon which a constant vacuum or suction is maintained by said equipment.

Other objectives and advantages will come to light as I proceed with the detailed description of my invention which is illustrated in the accompanying drawings.

Figure 2:
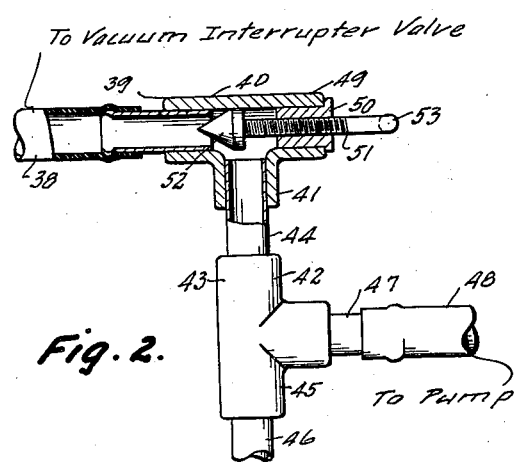
Figure 3:
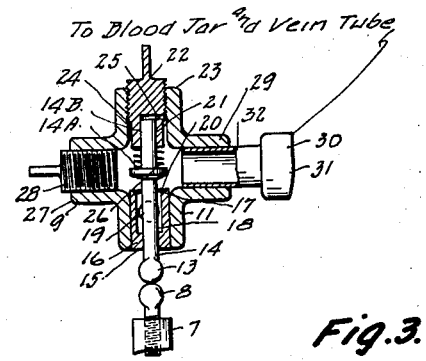
Figure 4:
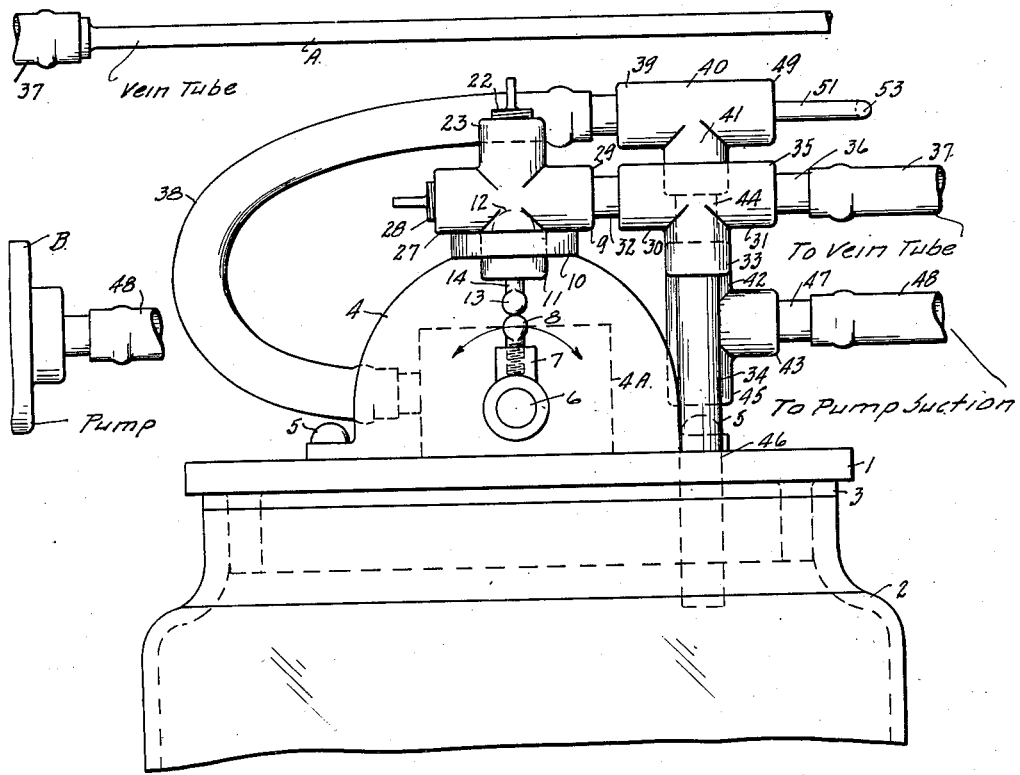
Figure 5:
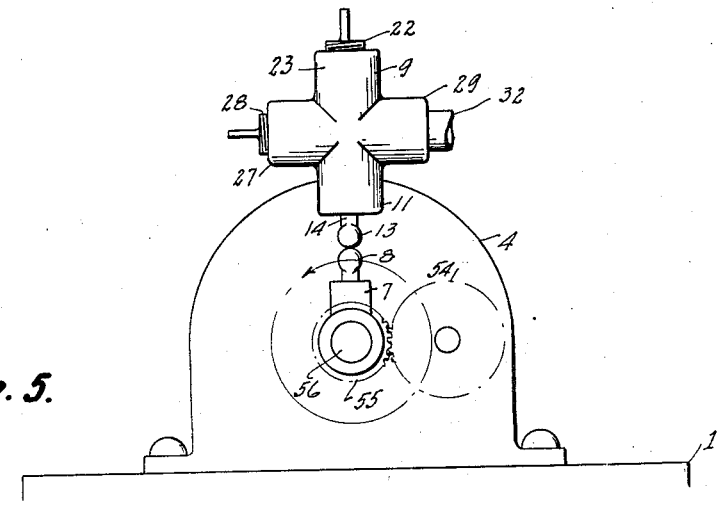

Fig. 1, of said drawings, is a plan view; Fig. 2 is a section on 2—2 of Fig. 1; Fig. 3 is a section on 3—3 of Fig. 1; Fig. 4 is a side elevation; and Fig. 5 shows a different valve-operating mechanism.

Thruout the drawings and specification similar numerals refer to similar parts.

In a co-pending application, Ser. No. 308,681, I have set forth a method and apparatus for aspirating the venous system wherein a means such as a reciprocating pump is used to provide pronounced surges of suction, with intervals of non-suction therebetween, on the venous system.

In a patent to Alfred M. Peterson, No. 2,097,039, is described and shown a means to clear a trocar that has become clogged.

The application and patent, supra, are the nuclei of the improvements set forth in this application.

The trocar of Peterson works fine in aspirating cavities. While so doing, the operator is manually moving the trocar about in the cavity, and so having it in his hand, he may readily trip the valve to free the trocar of an obstruction. When the vein tube is once inserted it is not moved about as is the trocar, hence it becomes necessary for the operator to constantly watch the flow of blood so that he may remove the tube should it become clogged. If the trocar of Peterson was adapted to be used as a vein tube it would still be necessary for the operator to give constant attention so that he could trip the valve should the device become clogged. It is very undesirable for an operator to have to stand and constantly watch the device for the hour and one-half or more that it usually takes to prepare a case. That hour and one-half may be better employed.

In the device set forth in my application, Ser. No. 308,681, I have provided means which permit the vein tube to be inserted and tied into the venous system and the artery tube to be inserted and tied into the arterial system of the cadaver. This device provides the spaced surges of suction as well as pressure. It also provides the means for automatically periodically tripping the valve to admit air to the vein tube or trocar. I have developed and used such a means.

However, this requires a special trocar and a special vein tube. The device of this present application requires no special trocar, no special vein tube, and no special means for providing the vacuum periodically. In other words, any of the trocars or vein tubes now in use may still be employed with the present device. I may use my reciprocating pump to provide the vacuum, I may use a water-operated aspirator, in fact, I may use any of the "constant-pressure" means now in use, as taught by Dwyer, 1,806,845, Grontkowski, 2,118,704, and others.

While I have used the rubber top provided for blood jars upon which to mount my device, I believe that a top made of some light stiff material such as aluminum or "Bakelite" is better. I have shown such a top 1 on the blood jar 2 and a sealing ring 3 made of some soft material, as a rubber compound, positioned between the top of the cap and the top of the jar. Whatever type of cap is used it should be airtight. The blood jar cap forms a convenient means on which to mount my device but without illustration it is readily apparent that the unit may be detached or it may be mounted on the vein tube or trocar.

For the vacuum breaker or interrupter 4, I have found that any of those in commercial use as oscillatory wind shield wiper operators are suitable for use in my device. In this specification I do not believe that this device need be specifically described or shown except as it may be changed, altered, or arranged for the purpose employed.

The blood jar 2 is preferably made of glass so that the results of the operation of the device may be always in view. The device 4 is secured to the top of the cap 1 by the screws 5. The usual swipe is removed and in its place upon the oscillating shaft 6 is mounted the arm 7 into the top of which is screw-threaded a ball-headed terminal 8. A cross 9, which serves as a valve-containing means, is positioned above the terminal 8 and is supported by the plate 10, thru which the bottom portion 11 of the vertical run of the cross projects, secured to the top of the device 4 by the screws 12. From this bottom portion or leg 11 is extended a ball-headed portion or terminal 13 formed on the end of the valve stem 14. This valve stem 14 is slidable in the bearing 15 in the bushing 16 whose upper end is formed as a seat 17 against which the annular enlarged portion 14A of the valve stem 14 may be seated. This bushing 16 is counterbored to form an annular chamber 18 about said valve stem 14 whereby air at atmospheric pressure may enter thru the passage or inlet 19 and flow thru the valve 20, formed by the enlarged portion 14A and its seat 17, to the blood jar 2 and to the vein tube (not shown). The upper end 14B of the valve stem is slidable in the bearing 21 formed by counterboring the bottom of the plug 22 screw-threaded into the upper leg 23 of the vertical run of the cross 9. This plug 22 is turned down to form an annular chamber 24 about its lower portion. This chamber 24 is connected with the counterbored bearing 21 by the passage 25 so that air entrapped in said bearing may escape and not impede the free movement of said valve stem as it is raised by operative engagement of the terminals 8 and 13. Between the enlarged portion 14A and the bottom of the plug 22 is positioned a coil compression spring 26 to insure the return of said portion to its seat 17 when the terminals are out of operative contact.

The leg 27 of the horizontal run of the cross 9 is provided with a plug 28 screw-threaded therein to seal said leg. The opposite leg 29 is connected to the leg 30 of the horizontal run of the T 31 by the nipple 32. The branch 33 of this T 31 is connected to the blood jar 2 by the nipple 34 which extends a short distance into the interior of the blood jar and is tightly fixed in the cap 1 to be airtight therein and to serve as a support for the T 31. The opposite leg 35 of the horizontal run of the T 31 is provided with a tube end 36 over which is slipped the end of a rubber tube 37 on the other end of which is the vein tube A, or trocar, the vein tube being shown.

The device 4 is operated by the vacuum maintained in the blood jar 2. Its valve apparatus 4A (not shown in detail) is connected to the source of vacuum. In the instant case, this valve apparatus 4A is connected by the rubber tube 38 to the leg 39 of the horizontal run of the T 40 whose branch 41 is connected to the leg 42 of the vertical run of the T 43 by the nipple 44. The opposite leg 45 of said run of the T 43 is connected to the blood jar 2 by the nipple 46 which extends a short distance into the interior of the jar and is tightly fixed in the cap 1 to be airtight therein and to serve as a support for the T 43. The branch of said T 43 is provided with a tube end 47 over which is slipped the end of the rubber tube 48 whose other end is connected to the pump B or other means for providing the vacuum, no detailed means being shown. The leg 49 of the horizontal run of the T 40 is provided with a bushing 50 screw-threaded for the reception of the shank 51 of a needle valve 52 adapted to be advanced to throttle the admission of air to the valve apparatus 4A by turning the handle portion 53 on the end of said shank 51 exterior of said T 40, whereby the speed of the valve apparatus 4A and incidently the oscillation of the arm 7 may be regulated as desired. I find a speed of approximately 20 complete oscillations of the arm 7 to be satisfactory in practice. In other words, the vacuum is interrupted or weakened approximately 40 times per minute. I find that the air admission interval best suited to be short and fast so that the jolts are quick and pronounced. Although suction on the jar may be constant it is broken up into pronounced surges of suction separated by intervals of reduced or weakened suction therebetween, which action, as disclosed in my co-pending application Ser. No. 308,681, permits of the venous system being aspirated without collapsing the veins, whereby I have been able to aspirate approximately 95% of the blood, thus permitting a more complete distribution of the embalming fluid which makes for a better job. At the same time that this vacuum is being interrupted, the vein tube, or trocar, is being cleared of any obstruction. In addition to the way air must be admitted, just the right amount must be admitted. This may be regulated to the machine or the implements employed by it by adjusting the terminal 8.

Commercial vacuum-operated oscillators as the device 4 take many forms and hence many arrangements of parts may be effected without departing from the basic idea. Other means, such as mechanical and electrical drives may be used to either rotate or oscillate the arm 7. However, I believe the vacuum drive to be the best and most easily regulated to conditions. It requires no outside sources of power for operation or equipment that is in the way.

In Fig. 5, I have shown a gear 54, which may be spring-operated as in any clock mechanism, driving the pinion 55 on the shaft 56 on which the arm 7 is mounted for rotation.

As is well known to all versed in the art, steam, water, or air, may be utilized to effect a suction which would be similar to that effected by a rotary or gear pump or compressor, or in other words a steady suction as distinguished from the suction produced by my reciprocating pump.

In the preferred form of my invention which I have illustrated, the blood jar is in the suction line. This would not be necessary if an aspirator is employed for the suction means since the blood does not pass thru parts that might be clogged or not easily cleaned. It is to be noted that the blood does not pass thru, nor can it get into, the valves or other moving parts of my device.

In view of the foregoing, I do not limit my invention to the specific forms shown or described but extend it to all that come fairly within the scope of the appended claims.

I claim:

1. In an apparatus for preparing a cadaver for burial, in combination, means for imposing a sub-atmospheric pressure on fluid-holding portions of the cadaver to cause a column of fluid to flow therefrom, and means to automatically periodically admit air at a greater pressure to said column to cause a regurgitation in the flow thereof whereby to aid in breaking up yieldable matter therein which may obstruct said flow.

2. In an apparatus for preparing a cadaver for burial, in combination, a constant-suction means for imposing a sub-atmospheric pressure on fluid-holding portions of the cadaver to cause a column of fluid to flow therefrom, and means to automatically periodically admit air at a greater pressure to said column to cause a regurgitation in the flow thereof whereby to aid in breaking up yieldable matter therein which may obstruct said flow.

3. In an apparatus for preparing a cadaver for burial, in combination, means for imposing a sub-atmospheric pressure on fluid-holding portions of the cadaver to cause a column of fluid to flow therefrom, and means to automatically periodically admit air at a greater pressure to said column to cause a regurgitation in the flow thereof whereby to aid in breaking up yieldable matter therein which may obstruct said flow, said air admission means being positioned out of line with the movement of said fluid column.

4. In an apparatus for preparing a cadaver for burial, in combination, means for imposing a sub-atmospheric pressure on fluid-holding portions of the cadaver to cause a column of fluid to flow therefrom, means to automatically periodically admit air at a greater pressure to the column to cause a regurgitation in the flow thereof whereby to aid in breaking up yieldable matter therein which may obstruct said flow, and means to regulate the amount of air admitted.

5. In an apparatus for preparing a cadaver for burial, in combination, means for imposing a sub-atmospheric pressure on fluid-holding portions of the cadaver to cause a column of fluid to flow therefrom, means to automatically periodically admit air at a greater pressure to said column to cause a regurgitation in the flow thereof whereby to aid in breaking up yieldable matter therein which may obstruct said flow, and means to regulate the speed at which air is admitted.

6. In an apparatus for preparing a cadaver for burial, in combination, means for imposing a sub-atmospheric pressure on the venous system of the cadaver to cause a column of fluid to flow therefrom, and means to automatically periodically admit air at a greater pressure to said column to cause a momentary regurgitation in the flow thereof whereby to aid in preventing collapse in said venous system and in breaking up yieldable matter therein which may obstruct said flow.

7. In an apparatus for preparing a cadaver for burial, in combination, means for imposing a subatmospheric pressure on fluid-holding portions of the cadaver to cause a column of fluid to flow therefrom, means to cause a regurgitation in the flow comprising an air inlet, a valve, and means to automatically periodically operate the valve to admit air at a greater pressure to the fluid column to effect said regurgitation whereby to aid in breaking up yieldable matter therein which may obstruct said flow.

8. In an apparatus for preparing a cadaver for burial, in combination, means for providing a partial vacuum and imposing a sub-atmospheric pressure on fluid-holding portions of the cadaver to cause a column of fluid to flow therefrom, and means to cause a regurgitation in the flow comprising an air inlet, a valve, and means operable by the partial vacuum to automaticaly periodicaly operate the valve to admit air at a greater pressure to the fluid column to effect said regurgitation whereby to aid in breaking up yieldable matter therein which may obstruct said flow.

9. In an apparatus for preparing a cadaver for burial, in combination, means for providing a partial vacuum and imposing a sub-atmospheric pressure on fluid-holding portions of the cadaver to cause a column of fluid to flow therefrom, means to cause a regurgitation in the flow comprising an air inlet, a valve, and an oscillating arm operable by the partial vacuum to automatically periodically operate the valve to admit air at a greater pressure to the fluid column to effect said regurgitation whereby to aid in breaking up yieldable matter therein which may obstruct said flow, means to regulate the amount of air admitted, and means to regulate the speed at which it is admitted.

CLAY P. MOODY.